US007895582B2

(12) United States Patent
Duffy et al.

(10) Patent No.: US 7,895,582 B2
(45) Date of Patent: Feb. 22, 2011

(54) FACILITATING STACK READ AND WRITE OPERATIONS IN A SOFTWARE TRANSACTIONAL MEMORY SYSTEM

(75) Inventors: John Joseph Duffy, Renton, WA (US); Michael M. Magruder, Sammamish, WA (US); Goetz Graefe, Bellevue, WA (US); David Detlefs, Westford, WA (US)

(73) Assignee: Microsoft Corporation, Redmond, WA (US)

( * ) Notice: Subject to any disclaimer, the term of this patent is extended or adjusted under 35 U.S.C. 154(b) by 1237 days.

(21) Appl. No.: 11/499,012

(22) Filed: Aug. 4, 2006

(65) Prior Publication Data

US 2008/0127150 A1    May 29, 2008

(51) Int. Cl.
G06F 9/45    (2006.01)
G06F 9/445    (2006.01)
(52) U.S. Cl. .................. 717/140; 717/145; 717/148
(58) Field of Classification Search ......... 717/139–148, 717/150–154
See application file for complete search history.

(56) References Cited

U.S. PATENT DOCUMENTS

| | | | | |
|---|---|---|---|---|
| 4,898,132 | A * | 2/1990 | Kanno ..................... | 123/179.3 |
| 5,121,498 | A * | 6/1992 | Gilbert et al. ............. | 717/149 |
| 5,263,155 | A | 11/1993 | Wang | |
| 5,274,820 | A * | 12/1993 | Gillet ........................ | 717/139 |
| 5,446,899 | A * | 8/1995 | Brett ........................ | 717/145 |
| 5,761,477 | A * | 6/1998 | Wahbe et al. ............. | 718/1 |
| 5,802,373 | A * | 9/1998 | Yates et al. ............... | 717/139 |
| 5,875,334 | A * | 2/1999 | Chow et al. .............. | 717/141 |
| 6,047,125 | A * | 4/2000 | Agesen et al. ............ | 717/148 |
| 6,219,666 | B1 | 4/2001 | Krishnaswamy et al. | |
| 6,223,335 | B1 | 4/2001 | Cartwright, Jr. et al. | |
| 6,240,413 | B1 | 5/2001 | Learmont | |
| 6,314,563 | B1 * | 11/2001 | Agesen et al. ............ | 717/108 |
| 6,397,379 | B1 * | 5/2002 | Yates et al. ............... | 717/140 |
| 6,499,123 | B1 * | 12/2002 | McFarland et al. ........ | 714/724 |
| 6,681,226 | B2 | 1/2004 | Bretl et al. | |
| 6,704,926 | B1 * | 3/2004 | Blandy et al. ............. | 717/148 |
| 6,735,760 | B1 * | 5/2004 | Dice ......................... | 717/139 |
| 6,826,757 | B2 | 11/2004 | Steele, Jr. et al. | |
| 6,865,734 | B2 * | 3/2005 | Holzle et al. .............. | 717/153 |
| 6,874,141 | B1 * | 3/2005 | Swamy et al. ............. | 717/144 |
| 6,952,829 | B1 | 10/2005 | Banavar et al. | |

(Continued)

OTHER PUBLICATIONS

Moravan et al.,"Supporting nested transactional memory in logTM", ACM ASPLOS, pp. 359-370, 2006.*

(Continued)

*Primary Examiner*—Anil Khatri

(57) ABSTRACT

Various technologies and techniques facilitate stack read and write operations in a software transactional memory system. If the compiler determines that an address for a variable in a code segment is a stack location, the stack location is live on entry, and the address of the variable has not been taken and passed to another thread, the code is changed to ensure failure atomicity. One example includes modifying the code so a shadow copy is saved for local variables that are live on entry. If the same prior criteria are true except the stack location is not live on entry, the code is optimized by ensuring code for logging and software transactional memory operations are not included. If the compiler does not know the address is the stack location or that the address is not passed to another thread, the code is changed to ensure failure and concurrency atomicity.

20 Claims, 13 Drawing Sheets

U.S. PATENT DOCUMENTS

| | | | |
|---|---|---|---|
| 6,981,249 B1 * | 12/2005 | Knoblock et al. | 717/141 |
| 7,000,234 B1 | 2/2006 | Shavit et al. | |
| 7,017,160 B2 | 3/2006 | Martin et al. | |
| 7,028,293 B2 * | 4/2006 | Ruf | 717/152 |
| 7,065,752 B2 * | 6/2006 | Willard | 717/140 |
| 7,069,545 B2 * | 6/2006 | Wang et al. | 717/131 |
| 7,080,364 B2 * | 7/2006 | Tang et al. | 717/140 |
| 7,082,600 B1 * | 7/2006 | Rau et al. | 717/148 |
| 7,111,290 B1 * | 9/2006 | Yates et al. | 717/158 |
| 7,254,597 B2 * | 8/2007 | Moir et al. | 1/1 |
| 7,254,806 B1 * | 8/2007 | Yates et al. | 717/136 |
| 7,254,808 B2 * | 8/2007 | Trappen et al. | 717/143 |
| 7,395,382 B1 * | 7/2008 | Moir | 711/147 |
| 7,428,725 B2 * | 9/2008 | Niyogi et al. | 717/109 |
| 7,478,210 B2 * | 1/2009 | Saha et al. | 711/159 |
| 7,555,619 B2 * | 6/2009 | Harris | 711/162 |
| 7,590,806 B2 * | 9/2009 | Harris et al. | 711/154 |
| 7,716,640 B2 * | 5/2010 | Pik et al. | 717/124 |
| 2004/0015642 A1 | 1/2004 | Moir et al. | |

OTHER PUBLICATIONS

Quislant et al, "Improving signatures by locality exploitation for transactional memory", IEEE, pp. 303-312, 2009.*

Felber et al, "The VELOX transactional memory stack", IEEE, pp. 1-9, 2010.*

Jia et al, "Certifying compilation for a language with stack allocation", IEEE LICS, pp. 1-10, 2005.*

Kienzle, "Open Multithreaded Transactions: A Transaction Model for Concurrent Object-Oriented Programming", retrieved from <http://jotm.objectweb.org/TP_related.html>, Apr. 2001, 269 pages.

Kienzle Jorg, "Open Multithreaded Transactions a Transaction Model for Concurrent Object-Oriented Programming", Date: Apr. 2001, http://nenya.ms.mff.cuni.cz/related/publ/tp/kienzle-thesis.pdf.

McDonald, et al, "Architectural Semantics for Practical Transactional Memory", Date: 2006, pp. 53-65, IEEE Computer Society, Washington, DC, USA, http://portal.acm.org/citation.cfm?id=1136491&coll=Portal&dl=GUIDE&CEID=188370&CE.

Saha, et al, "McRT-STM: a high performance software transactional memory system for a multi-core runtime", Date: 2006, pp. 187-197, ACM Press, New York, USA, http://portal.acm.org/citation.cfm?id=1123001&coll=Portal&dl=GUIDE&CFID=188370&CF.

Tabatabai, et al, "Compiler and runtime support for efficient software transactional memory", Date: 2006, pp. 26-37, ACM Press, New York, USA, http://portal.acm.org/citation.cfm?id=1133985&coll=Portal&dl=GUIDE&CFID=188370&CF.

* cited by examiner

```
int x = 0;
atomic {
    x = x + 1;
    foo();
}
```

FIG. 6

```
int x = 0;
while (TRUE) {
    TxStackBase();
    LogPriorValue(&x, x);
    x = x + 1;
    foo();
    if (TxCommit()) // true means commit, false means rolled back
        break;
}
```

```
int x = 0;
int __shadow_x = x;
while (TRUE) {
    x = x + 1;
    foo();
    if (TxCommit()) // true means commit, false means rolled back
        break;
    else
        x = __shadow_x;
}
```

```
void g(int * p) {
    while (TRUE) {
        TxStackBase();
        OpenForWrite(p,
lockAddrForAddr(p));
        LogPriorValue(p,
*p);
        *p = 33;
        if (TxCommit()) //
true means commit, false
means rolled back
            break;
    }
}
```

FACILITATING STACK READ AND WRITE OPERATIONS IN A SOFTWARE TRANSACTIONAL MEMORY SYSTEM

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. A data value in the context of transactional memory is the particular segment of shared memory being accessed, such as a single object, a cache line, a page, a single word, etc.

The state of the art in software transactional memory is focused primarily on heap operations. However, a software transactional memory system must also deal with stack allocated memory. Stack allocated memory can have a shorter lifetime than the transaction, which can result in dead memory locations. Software transactional memory systems can suffer from system instabilities or other problems by accessing such dead memory locations. Furthermore, current software transactional memory systems can suffer from performance problems by using failure atomicity techniques and/or concurrency atomicity techniques when they are not necessary.

SUMMARY

Various technologies and techniques are disclosed that facilitate stack read and write operations in a software transactional memory system. A software transactional memory system is provided that interacts with a compiler. If the compiler determines at compile time that a particular address for a variable in an original code segment is a stack location, that the stack location is live on entry to a current transaction scope, and that the particular address of the variable has not been taken and passed to another thread, then a first type of change is made to the original code segment in a manner that ensures failure atomicity. One example of the type of change made to the original code segment can include modifying the original code segment so that a copy is saved in a shadow local variable for each local variable that is live on entry to the current transaction scope.

If the compiler determines that a particular address for the variable in the original code segment is the stack location, that the stack location is not live on entry to the current transaction scope, and that the particular address of the variable has not been taken and passed to another thread, then a second type of change is made to the original code segment to optimize the code by ensuring that code for logging of a prior value of the variable is not included and that code for calling a software transactional memory operation is not included.

If the compiler does not know whether or not the particular address for the variable is a stack location, or if the compiler is not sure if the address of a local is taken and passed to another thread, then a third type of change is made to the original code segment that ensures both failure atomicity and concurrency atomicity.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a diagram that includes a code segment written by a developer in a programming language before interpretation by a compiler.

FIG. 7 is a diagram that includes a code segment for one implementation of the system of FIG. 1 and the stages of FIG. 4 that illustrate how the code segment of FIG. 6 is modified to use the logging operation.

FIG. 9 is a diagram that includes a code segment for one implementation of the system of FIG. 1 and the stages of FIG. 8 that illustrate how the code segment of FIG. 6 is modified to use the shadow copy operation.

FIG. 14 is a diagram that includes a code segment for one implementation of the system of FIG. 1 and the stages of FIG. 13 that illustrate how the code segment of FIG. 11 is modified to be optimized by ensuring that both failure atomicity and concurrency atomicity are achieved.

DETAILED DESCRIPTION

Figure 1:
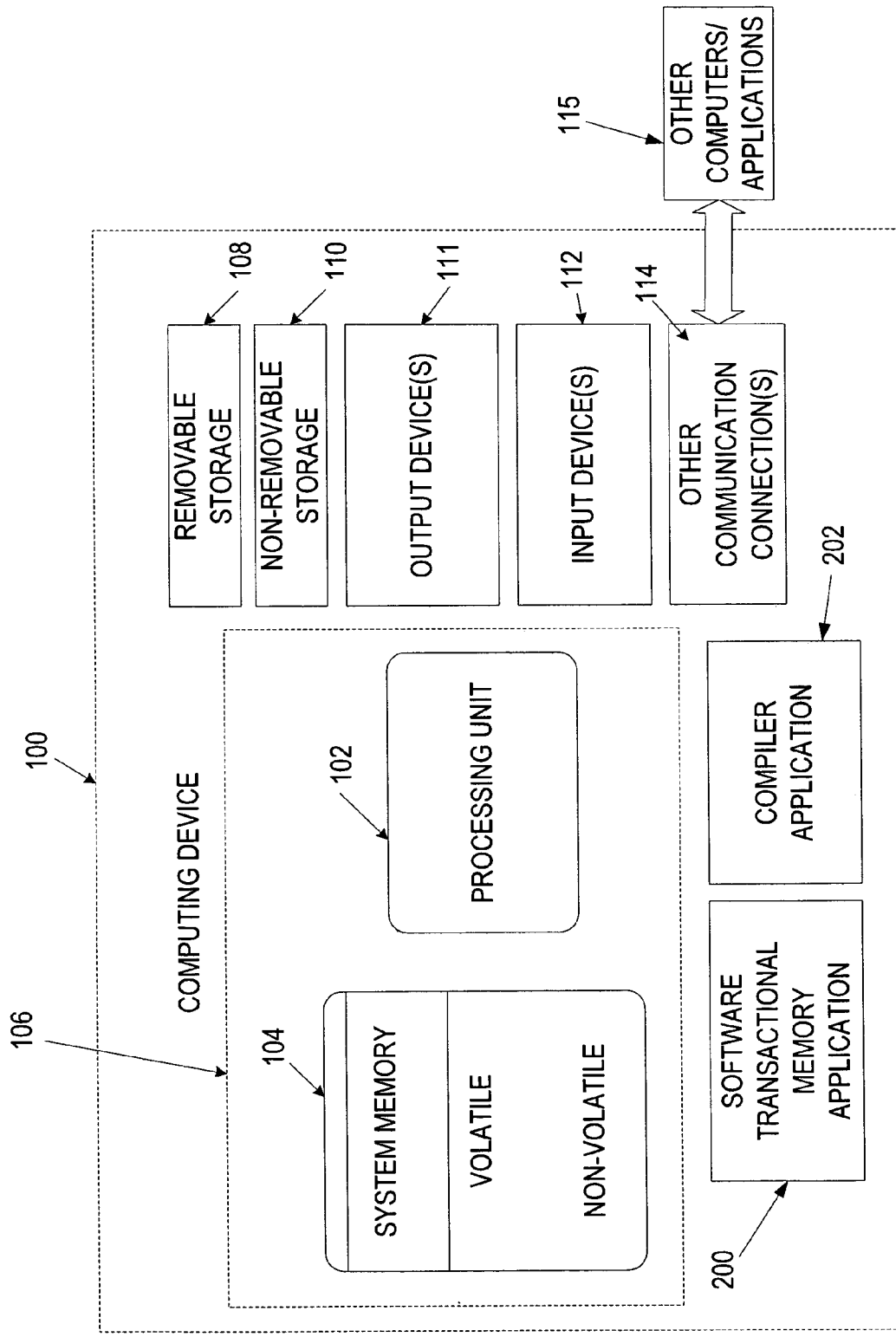
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes software transactional memory application 200 and compiler application 202. In one implementation, compiler application 202 uses the software transactional memory application 200 to generate properly transacted code.

Figure 2:
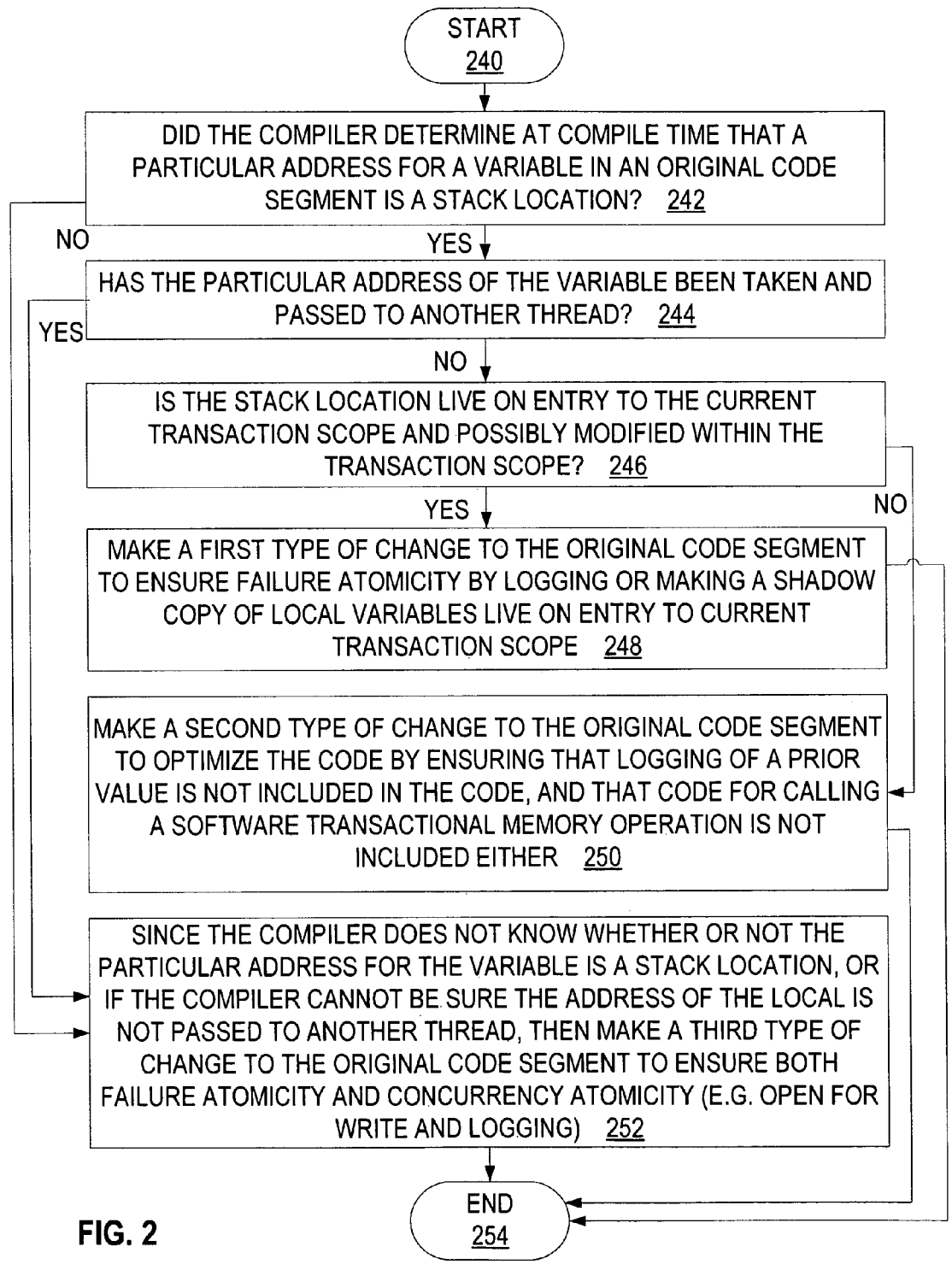
FIG. 2 is a high-level process flow diagram for one implementation of the system of FIG. 1.

Turning now to FIGS. 2-16 with continued reference to FIG. 1, the stages for implementing one or more implementations of software transactional memory application 200 are described in further detail. FIG. 2 is a high level process flow diagram for the system of FIG. 1. In one form, the process of FIG. 2 is at least partially implemented in the operating logic of computing device 100. The procedure begins at start point 240 with determining whether the compiler determined at compile time that a particular address for a variable in an original code segment is a stack location (decision point 242). If the particular address for the variable is a stack location (e.g. representing a local variable) (decision point 242), then the system determines if the particular address of the variable has been taken and passed to another thread (decision point 244).

If the particular address has not been taken and passed to another thread (decision point 244), then the system checks to see if the stack location is live on entry to the current transaction scope (decision point 246). The term "live on entry" as used herein means that the variable may be read before it is written. The term "not live on entry" means that the variable will be written before it is read again, if it is accessed at all. If the stack location is live on entry to the current transaction scope and possibly modified within the transaction scope (decision point 246), then a first type of change is made to the original code segment to ensure failure atomicity by logging or by making a shadow copy of local variables that are live on entry to the current transaction scope (stage 248). On the other hand, if the stack location is not live on entry (decision point 246), then a second type of change is made to the original code segment to optimize the code by ensuring that logging of a prior value is not included in the code, and that code for calling a software transactional memory operation is not included either (stage 250).

If the compiler does not know at compile time whether or not the particular address for the variable is a stack location (decision point 242) or if the compiler cannot be sure the address of the local is not passed to another thread (decision point 244), then make a third type of change to the original code segment to ensure both failure atomicity and concurrency atomicity (e.g. open for write and logging) (stage 252). In one implementation, in each of the three types of techniques described in FIG. 2, reads and writes inside the current transaction scope are performed directly against the stack location. The process ends at end point 254.

Figure 3:
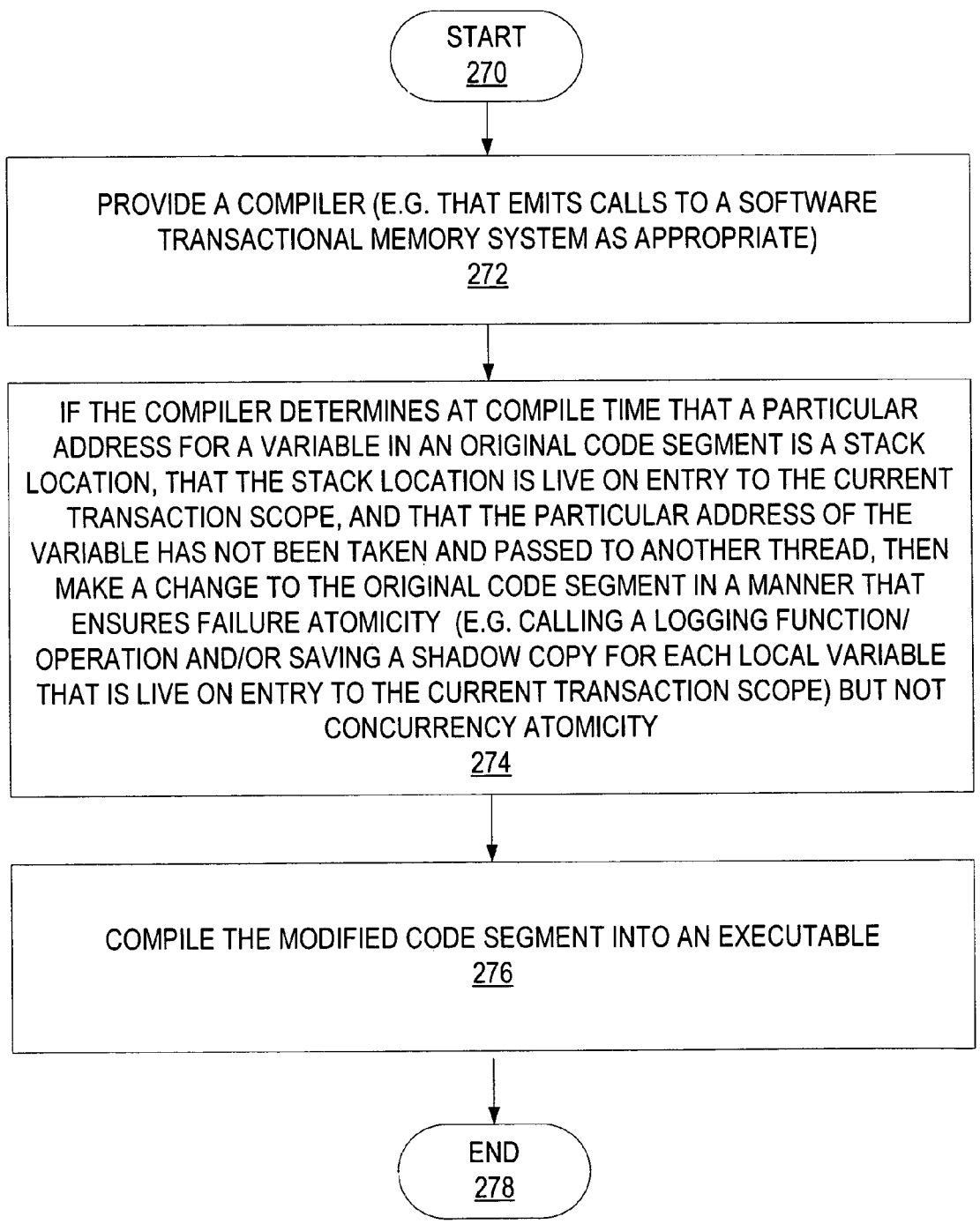
FIG. 3 is a process flow diagram for one implementation of the system of FIG. 1 illustrating the stages involved in modifying a code segment at compile time to ensure failure atomicity but not concurrency atomicity in a particular scenario.

FIG. 3 is a process flow diagram for one implementation of the system of FIG. 1 illustrating the stages involved in modifying a code segment at compile time to ensure failure atomicity but not concurrency atomicity in a particular scenario. In one form, the process of FIG. 3 is at least partially implemented in the operating logic of computing device 100. The procedure begins at start point 270 with providing a providing a compiler 202 (e.g. that emits calls to a software transactional memory system 200 as appropriate) (stage 272). If the compiler determines at compile time that a particular address for a variable in an original code segment is a stack location, that the stack location is live on entry to the current transaction scope, and that the particular address of the variable has not been taken and passed to another thread, then a change is made to the original code segment in a manner that ensures failure atomicity (e.g. by calling a logging function/operation and/or saving a shadow copy for each local variable that is live on entry to the current transaction scope) but not concurrency atomicity (stage 274). In one implementation, changes are made to one or more code segments by inserting code to call one or more procedures for achieving the particular desired result. In another implementation, changes are made to one or more code segments by inserting code directly inline to achieve the particular desired result. The modified code segment is compiled into an executable (stage 276). The process ends at end point 278.

Figure 4:
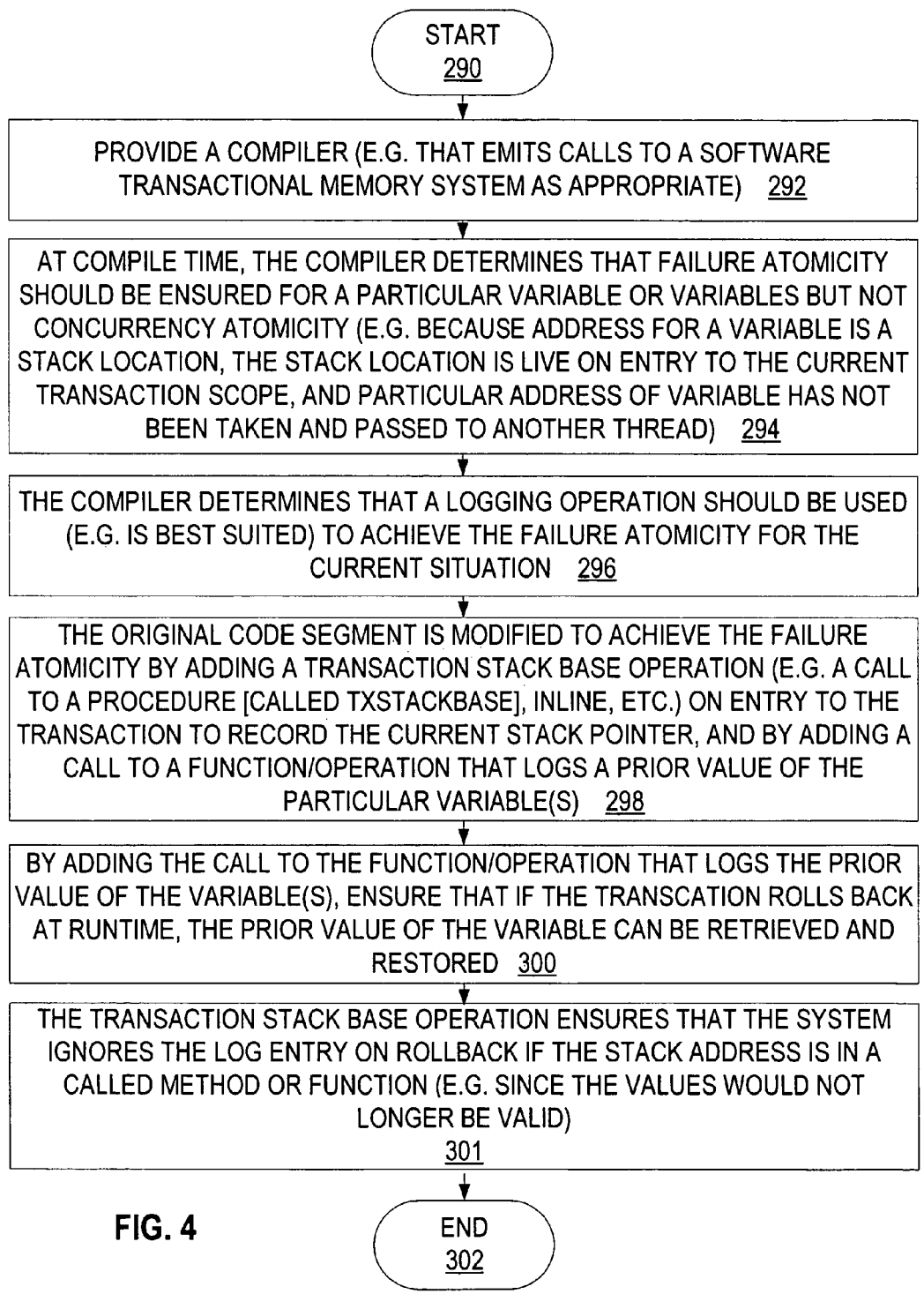
FIG. 4 is a process flow diagram for one implementation of the system of FIG. 1 illustrating the stages involved in modifying a code segment at compile time to ensure failure atomicity by using a logging operation.

FIG. 4 is a process flow diagram for one implementation of the system of FIG. 1 illustrating the stages involved in modifying a code segment at compile time to ensure failure atomicity by using a logging operation. In one form, the process of FIG. 4 is at least partially implemented in the operating logic of computing device 100. The procedure begins at start point 290 with providing a compiler (e.g. that emits calls to a software transactional memory system as appropriate) (stage 292). At compile time, the compiler determines that failure atomicity should be ensured for a particular variable or variables but not concurrency atomicity (e.g. because the address for the variable is a stack location, the stack location is live on entry to the current transaction scope, and the particular address of the variable has not been taken and passed to another thread) (stage 294).

The compiler determines that a logging operation should be used (e.g. is best suited) to achieve the failure atomicity for the current situation (stage 296). The original code segment is modified by to achieve the failure atomicity by adding a transaction stack base operation (e.g. a call to a procedure [called TxStackBase herein], inline code, etc.) on entry to the transaction to record the current stack pointer, and by adding a call to a function/operation that logs a prior value of the particular variable(s) (stage 298). By adding the call to the function/operation that logs the prior value of the variable(s), the system ensures that if the transaction rolls back at runtime, the prior value of the variable can be retrieved and restored (stage 300). The transaction stack base operation ensures that the system ignores the log entry on rollback if the stack address is in a called method or function (e.g. since the values would no longer be valid) (stage 301). If the transaction calls another function with transacted locals in it, the system will also be able to recognize them and not roll them back. The process ends at end point 302.

Figure 5:
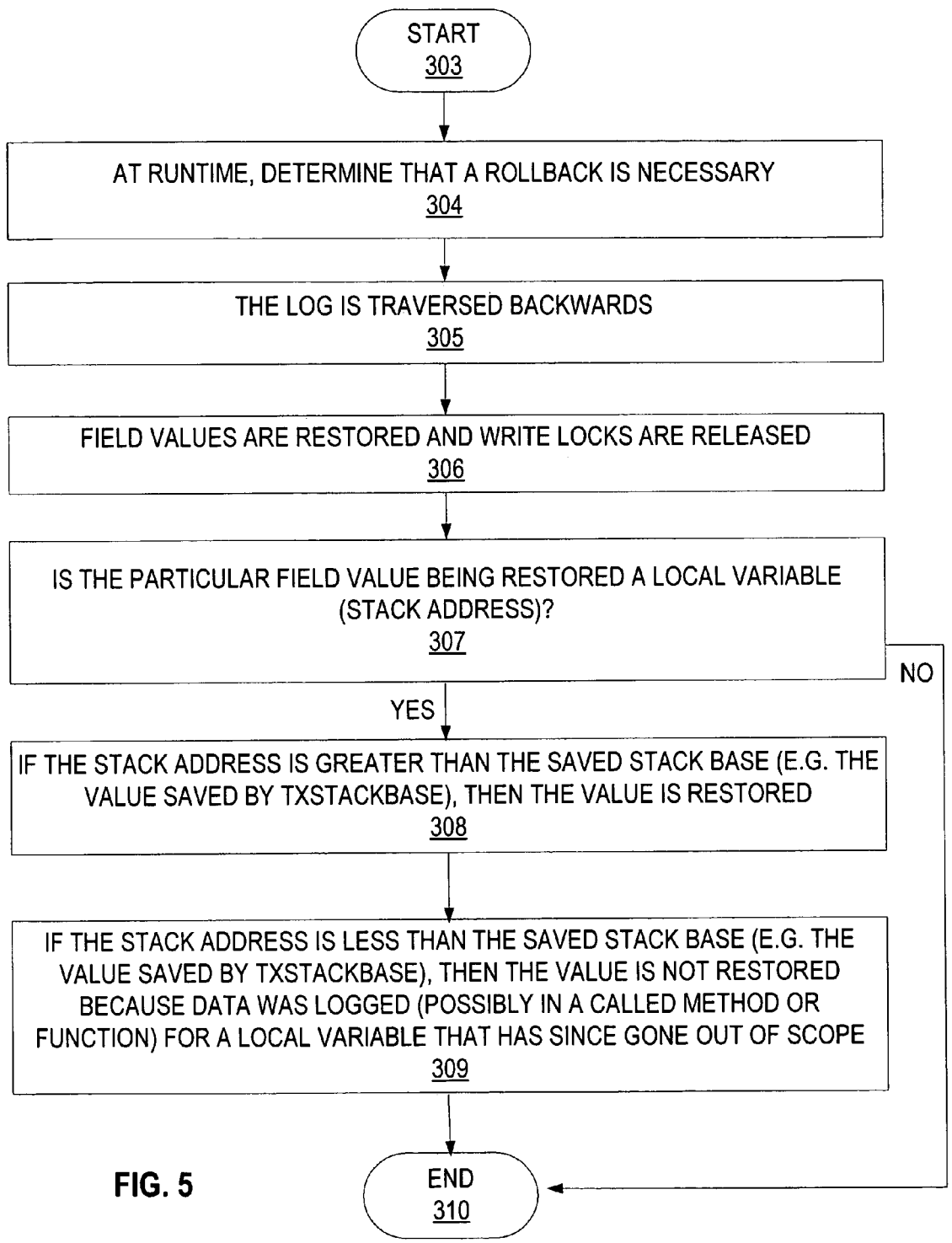
FIG. 5 is a process flow diagram for one implementation of the system of FIG. 1 illustrating the stages involved in rolling back and restoring field values.

FIG. 5 is a process flow diagram for one implementation of the system of FIG. 1 illustrating the stages involved in rolling back and restoring field values. In one form, the process of FIG. 5 is at least partially implemented in the operating logic of computing device 100. In FIG. 5 and the other examples discussed herein, a downwards-growing stack is assumed. In other words, the caller stack frames are at addresses greater than those of callees. It will be appreciated that other variations could also be used, such as an upwards-growing stack. The procedure begins at start point 303 with determining at runtime that a rollback is necessary (stage 304). The log is traversed backwards (stage 305). Field values are restored and write locks are released (stage 306). As field values are restored, if the value being restored is of a local variable (stack address) (decision point 307), and if the stack address is greater than the saved stack base (e.g. the value saved by TxStackBase) then the value is restored (stage 308). If the value being restored is of a local variable (decision point 307), and if the stack address is less than the saved stack base, then the data is not restored because data was logged (possibly in a called method or function) for a local variable that has since gone out of scope (stage 309) and therefore the system must not try to restore the data or corruption of the thread's stack will occur. The process ends at end point 310.

FIG. 6 is a diagram that includes a code segment 311 written by a developer in a programming language before interpretation by a compiler. While the code example shown in FIG. 6 and other Figures herein are written in one language using a certain syntax, it will be appreciated by one in the software art that numerous other programming languages and/or syntaxes could be used in other implementations. In the example shown, an atomic block 312 is shown to represent the transaction scope. Turning now to FIG. 7, a diagram for one implementation is shown that includes a code segment 314 to illustrate how the code segment of FIG. 6 is modified to use the logging operation. Using some or all of the techniques described in FIG. 4 and/or other techniques, the code segment 311 from FIG. 6 is transformed into the code segment 314 of FIG. 7.

In the example shown, within the transaction (which is represented by the while loop 316), the TxStackBase call 318 is made at the beginning of the transaction to record the current stack pointer. By recording the current stack pointer, software transactional memory operations can log prior values on local variables safely knowing that the system can decide not to rollback such a field value later based on the saved stack pointer. Within the transaction, a call may be made to another procedure, such as the call to procedure foo 313 shown in the example. Stack addresses introduced in foo 313 would not be rolled back because the values are dead when foo 313 returns. Failure atomicity is achieved in the modified code segment 314 of FIG. 7 by insertion of a call to a logging operation 320 called LogPriorValue. The LogPriorValue operation 320 is called so that the value of the variable X is recorded in the log, and can be retrieved and restored in the event of a transaction rollback.

Figure 8:
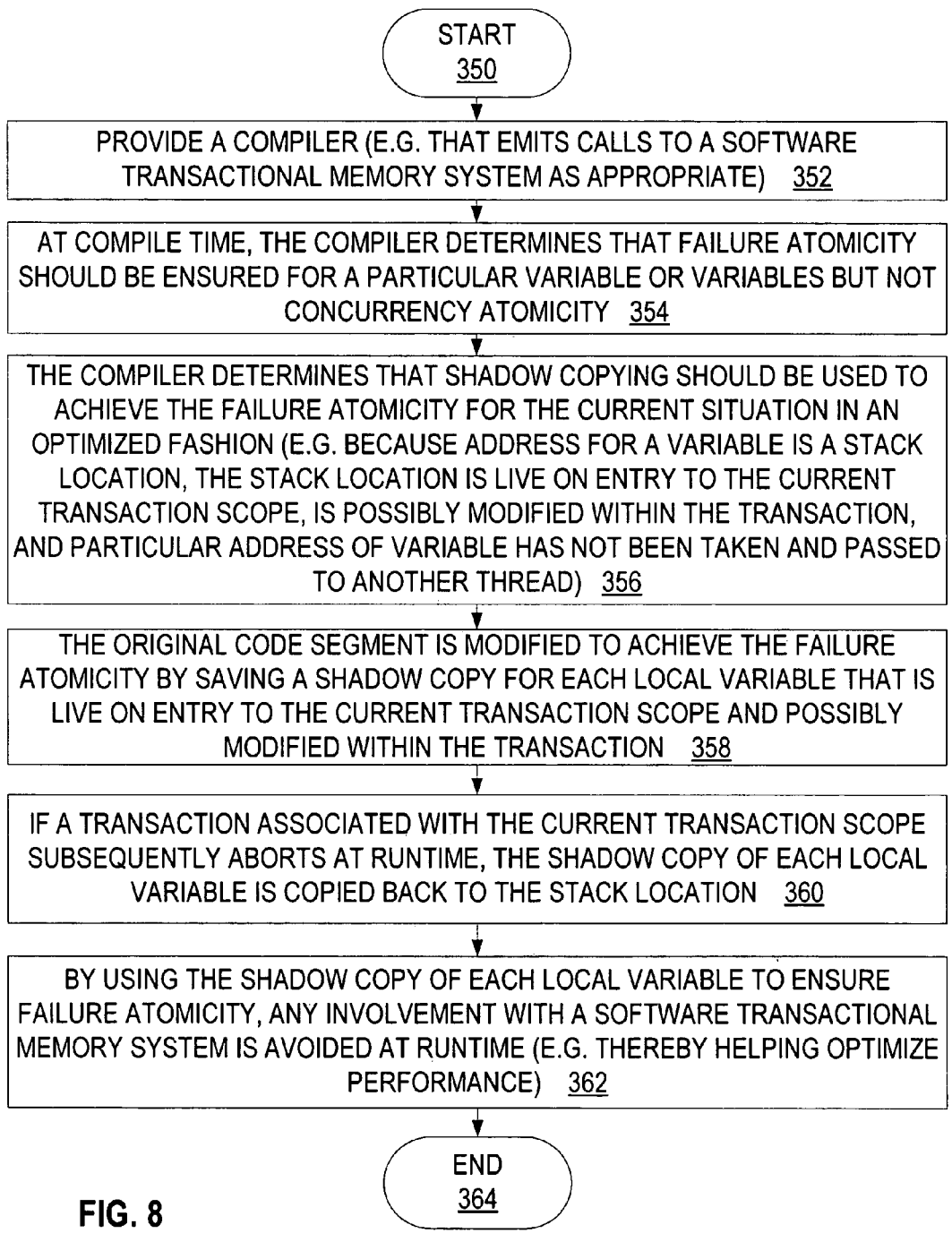
FIG. 8 is a process flow diagram for one implementation of the system of FIG. 1 illustrating the stages involved in modifying a code segment to ensure failure atomicity by using a shadow copy operation.

FIG. 8 is a process flow diagram for one implementation of the system of FIG. 1 illustrating the stages involved in modifying a code segment to ensure failure atomicity by using a shadow copy operation. In one form, the process of FIG. 8 is at least partially implemented in the operating logic of computing device 100. The procedure begins at start point 350 with providing a compiler (e.g. that emits calls to a software transactional memory system as appropriate) (stage 352). At compile time, the compiler determines that failure atomicity should be ensured for a particular variable or variables but not concurrency atomicity (stage 354). The compiler determines that shadow copying should be used to achieve the failure atomicity for the current situation in an optimized fashion (e.g. because the address for a variable is a stack location, the stack location is live on entry to the current transaction scope, is possibly modified within the current transaction scope, and the particular address of the variable has not been taken and passed to another thread) (stage 356). The original code segment is modified to achieve the failure atomicity by saving a shadow copy for each local variable that is live on entry to the current transaction scope and possibly modified within the transaction (stage 358). If the transaction subsequently aborts at runtime (e.g. is rolled back), the shadow copy of each local variable is copied back to the stack location (stage 360). By using the shadow copy of each local variable to ensure failure atomicity, any involvement with a software transactional memory system is avoided at runtime (e.g. thereby helping optimize performance) (stage 362). The process ends at end point 364.

Turning now to FIG. 9, a diagram is shown for one implementation that includes code segment 380 to illustrate how the code segment of FIG. 6 is modified to use the shadow copy operation. Using some or all of the techniques described in FIG. 9 and/or other techniques, the code segment 311 from FIG. 6 is transformed into the code segment 380 of FIG. 9. Failure atomicity is achieved in the modified code segment 380 by making shadow copies of all local variables that are live on entry to the current transaction scope and possibly modified within the transaction. In the example shown, a shadow local variable is declared and assigned at 382. During a rollback operation, the value of the shadow copy 386 is used to restore the prior value of X in the stack location. By using the shadow copy technique, there is no need to use software transactional memory operations, thereby optimizing the code and/or improving performance.

Figure 10:
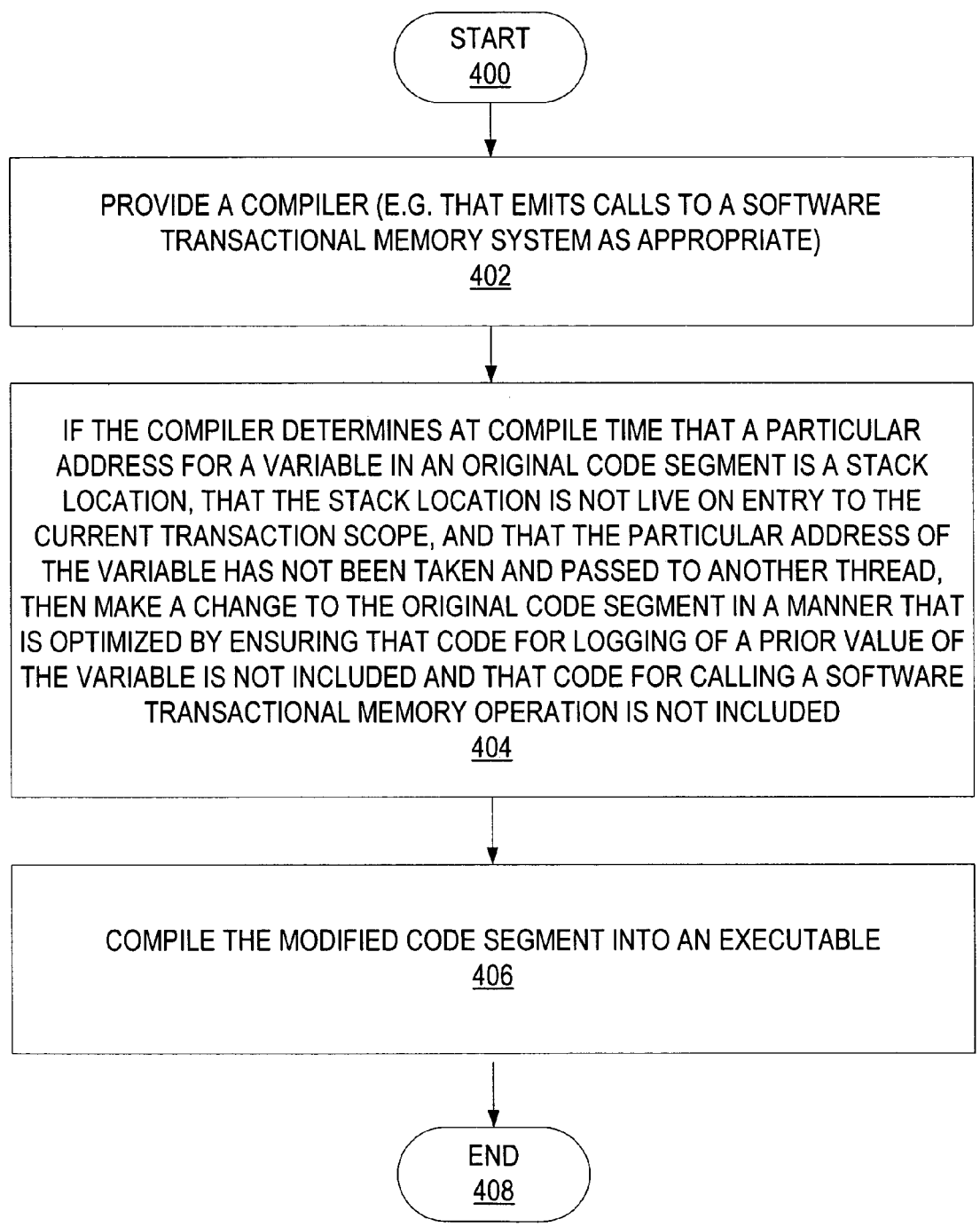
FIG. 10 is a process flow diagram for one implementation of the system of FIG. 1 that illustrates the stages involved in modifying a code segment at compile time to optimize the code by ensuring code for logging and software transactional memory operations are not used.

FIG. 10 is a process flow diagram for one implementation of the system of FIG. 1 that illustrates the stages involved in modifying a code segment at compile time to optimize the code by ensuring code for logging and software transactional memory operations are not used. In one form, the process of FIG. 10 is at least partially implemented in the operating logic of computing device 100. The procedure begins at start point 400 with providing a compiler (e.g. that emits calls to a software transactional memory system as appropriate) (stage 402). If the compiler determines at compile time that a particular address for a variable in an original code segment is a stack location, that the stack location is not live on entry to the current transaction scope, and that the particular address of the variable has not been taken and passed to another thread, then make a change to the original code segment in a manner that is optimized by ensuring that code for logging of a prior value of the variable is not included and that code for calling a software transactional memory operation is not included (stage 404). The modified code segment is compiled into an executable (stage 406). The process then ends at end point 408.

Figure 11:
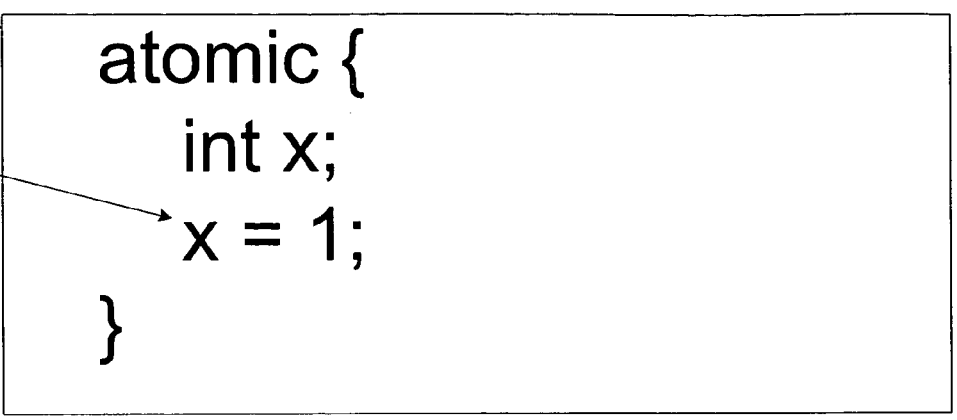
FIG. 11 is a diagram that includes a code segment written by a developer in a programming language before interpretation by a compiler.
Figure 12:
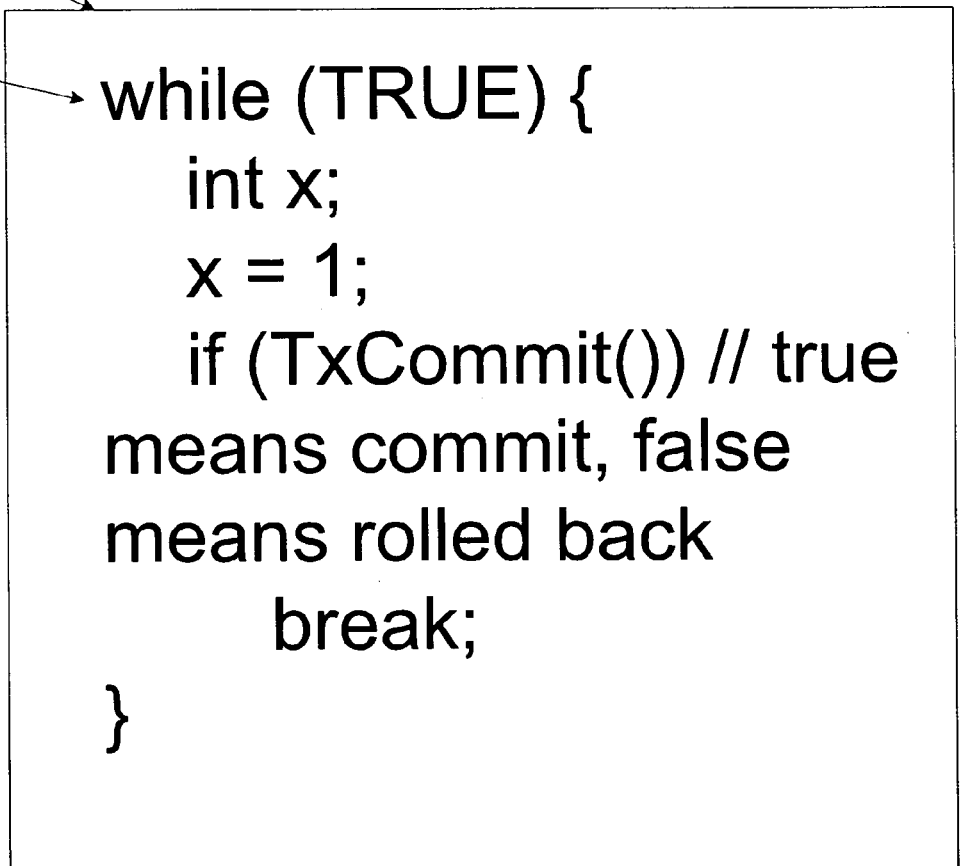
FIG. 12 is a diagram that includes a code segment for one implementation of the system of FIG. 1 and the stages of FIG. 10 that illustrate how the code segment of FIG. 11 is modified to be optimized by ensuring code for logging and software transactional memory operations are not used.

FIG. 11 is a diagram that includes a code segment 420 written by a developer in a programming language before interpretation by a compiler. The value X is written to before being read within the atomic block 422 (e.g. the transaction), which means that it is not live on entry. For this reason, the value of X does not need to be logged for rollback, as will be described in further detail in FIG. 12. Turning now to FIG. 12, a diagram is shown that includes a code segment 424 to illustrate how the code segment of FIG. 11 is modified according to some or all of the techniques described in FIG. 10 to be optimized by ensuring code for logging and software transactional memory operations are not used. In the example code segment shown 424, the while loop for the transaction does not include any logging code, nor does it include any software transactional memory operations.

Figure 13:
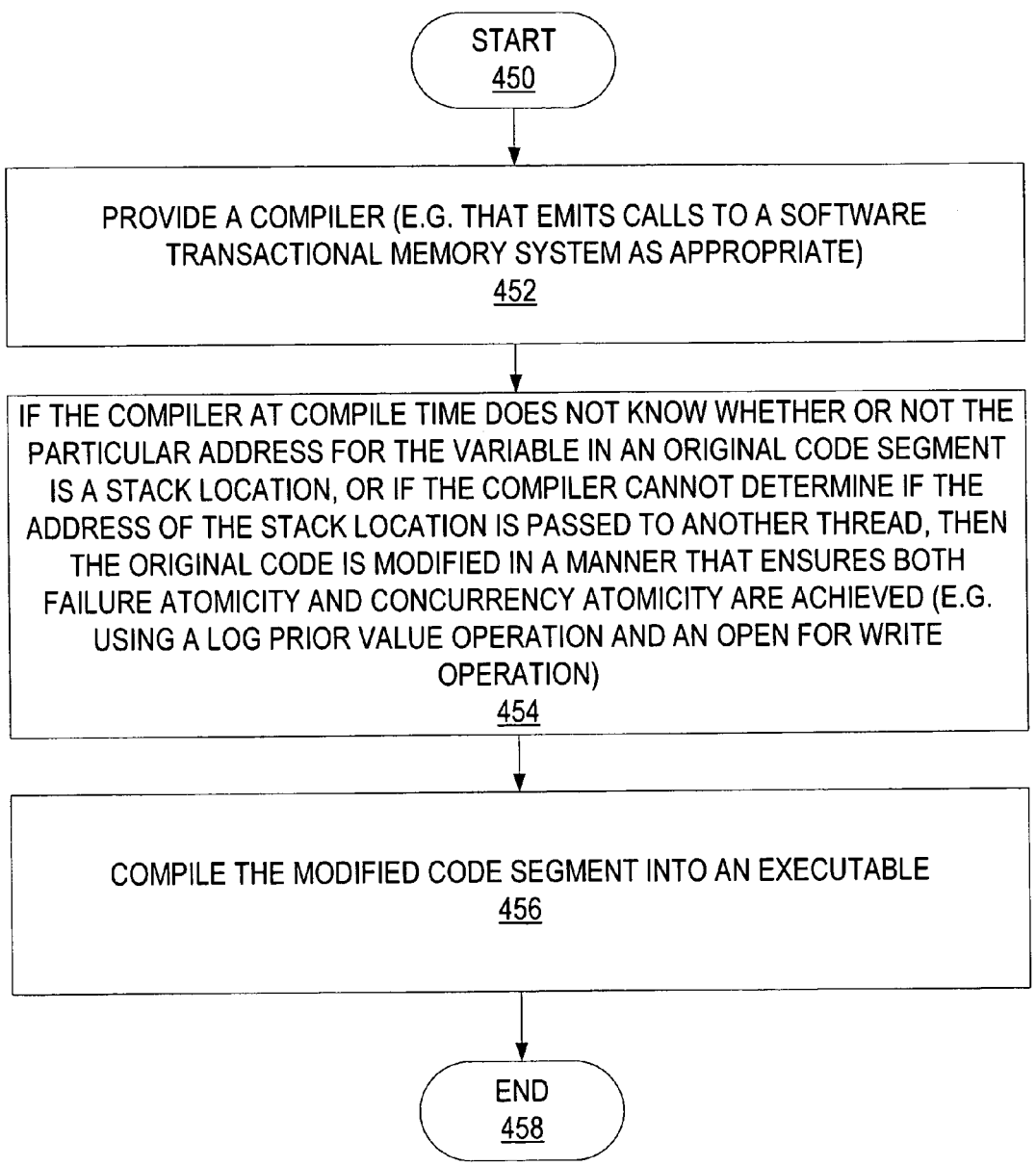
FIG. 13 is a process flow diagram for one implementation of the system of FIG. 1 that illustrates the stages involved in modifying a code segment at compile time to ensure that both failure atomicity and concurrency atomicity are achieved.

FIG. 13 is a process flow diagram for one implementation of the system of FIG. 1 that illustrates the stages involved in modifying a code segment at compile time to ensure that both failure atomicity and concurrency atomicity are achieved. In one form, the process of FIG. 13 is at least partially implemented in the operating logic of computing device 100. The procedure begins at start point 450 with providing a compiler (e.g. that emits calls to a software transactional memory system as appropriate) (stage 452). If the compiler at compile time does not know whether or not the particular address for the variable in an original code segment is a stack location, or if the compiler cannot determine if the address of the stack location is passed to another thread, then the original code is modified in a manner that ensures both failure atomicity and concurrency atomicity are achieved (e.g. using a log prior value operation and an open for write operation) (stage 454). The modified code segment is compiled into an executable (stage 456). The process ends at end point 458.

FIG. 14 is a diagram that includes a code segment 460 for one implementation that illustrate how the code segment of FIG. 11 is modified according to some or all of the techniques described in FIG. 13 to be optimized by ensuring that both failure atomicity and concurrency atomicity are achieved. In the example shown, concurrency atomicity is achieved by opening the data value for write 464 (opening an exclusive lock). A call is made to TxStackBase 462 immediately on entry to the transaction (e.g. atomic block). The TxStackBase procedure records the current stack pointer. By recording the current stack pointer, software transactional memory operations can log prior values on local variables safely knowing that the system can decide not to rollback such a field value later based on the saved stack pointer. The logging of prior values is for ensuring failure atomicity and is achieved by using the call to LogPriorValue 466. In one implementation, because the compiler is not sure whether or not the address for the variable in the code segment is a stack location or passed to another thread, these code segments to implement both concurrency atomicity and failure atomicity are inserted.

Figure 15:
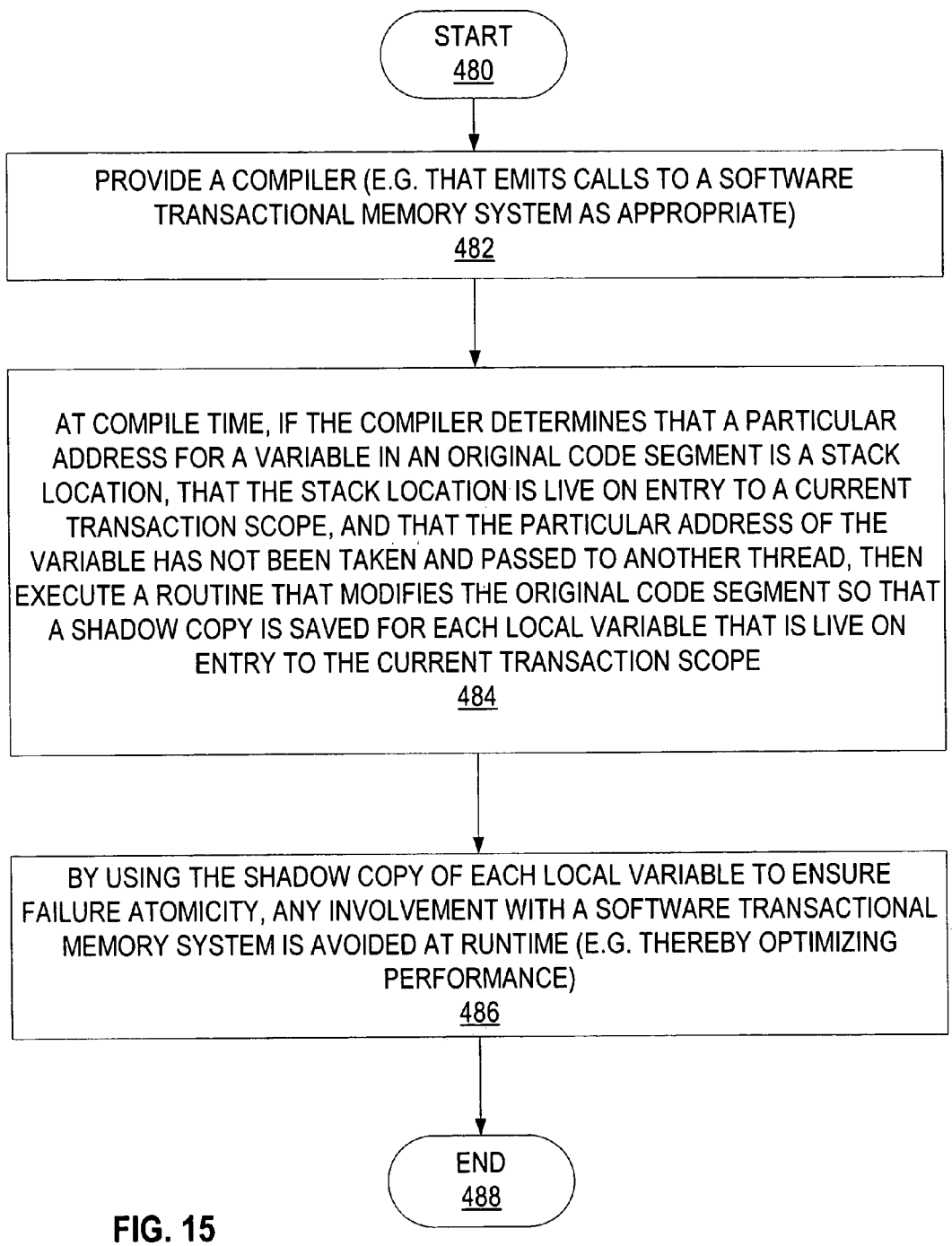
FIG. 15 is a process flow diagram for one implementation of the system of FIG. 1 that illustrates the stages involved in modifying a code segment at compile time to use shadow copying to ensure failure atomicity is achieved in an optimized way.

FIG. 15 is a process flow diagram for one implementation of the system of FIG. 1 that illustrates the stages involved in modifying a code segment at compile time to use shadow copying to ensure failure atomicity is achieved in an optimized way. In one form, the process of FIG. 15 is at least partially implemented in the operating logic of computing device 100. The procedure begins at start point 480 with providing a compiler (e.g. that emits calls to a software transactional memory system as appropriate) (stage 482). At compile time, if the compiler determines that a particular address for a variable in an original code segment is a stack location, that the stack location is live on entry to a current transaction scope, and that the particular address of the variable has not been taken and passed to another thread, then the system executes a routine that modifies the original code segment so that a shadow copy is saved for each local variable that is live on entry to the current transaction scope (stage 484). By using the shadow copy of each local variable to ensure failure atomicity, any involvement with a software transactional memory system is avoided at runtime (e.g. thereby optimizing performance) (stage 486). The process ends at end point 488.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, and/or data layouts as described in the examples discussed herein could be organized differently on one or more computers to include fewer or additional options or features than as portrayed in the examples.

What is claimed is:

1. A method for facilitating operation of a software transactional memory system with stack locations comprising the steps of:
   providing a software transactional memory system, the software transactional memory system interacting with a compiler; and
   if the compiler determines at compile time that a particular address for a variable in an original code segment is a stack location, that the stack location is live on entry to a current transaction scope, and that the particular address of the variable has not been taken and passed to another thread, then making a change to the original code segment, using a processing unit, in a manner that ensures failure atomicity to provide a changed original code segment;
   wherein the change comprises modifying the original code segment so that a shadow copy is saved for each local variable that is live on entry to the current transaction scope.

2. The method of claim 1, wherein the change further comprises adding a call to a function that logs a prior value of the variable.

3. The method of claim 2, wherein the call to the function that logs the prior value of the variable ensures that if a transaction rolls back, the prior value of the variable can be retrieved and restored.

4. The method of claim 3, wherein the change further comprises adding a transaction stack base operation upon entry into the current transaction scope and prior to the function that logs the prior value, the transaction stack base operation being operable to log a stack pointer value.

5. The method of claim 1, wherein the change further comprises modifying the original code segment so that if a transaction subsequently aborts, the shadow copy of each local variable is copied back to the stack location.

6. The method of claim 5, wherein by using the shadow copy of each local variable to ensure failure atomicity, any involvement with the software transactional memory system is avoided at runtime.

7. A computer-readable storage medium having computer-executable instructions for causing a computer to perform the steps recited in claim 1.

8. A method for facilitating operation of a software transactional memory system with stack locations comprising the steps of:
   providing a software transactional memory system, the software transactional memory system interacting with a compiler; and
   if the compiler determines at compile time that a particular address for a variable in an original code segment is a stack location, that the stack location is live on entry to a current transaction scope, and that the particular address of the variable has not been taken and passed to another thread, then making a change to the original code segment, using a processing unit, in a manner that ensures failure atomicity to provide a changed original code segment;
   wherein the compiler determines based upon at least one factor whether to use a first approach or a second approach for ensuring failure atomicity for the current transaction scope, the first approach comprising changing the original code segment by adding a call to a function that logs a prior value of the variable, and the second approach comprising changing the original code segment so that a shadow copy is saved for each local variable that is live on entry to the current transaction scope.

9. A computer-readable storage medium having computer-executable instructions for causing a computer to perform the steps recited in claim 8.

10. The method of claim 8, wherein the call to the function that logs the prior value of the variable ensures that if a transaction rolls back, the prior value of the variable can be retrieved and restored.

11. A computer-readable storage medium having computer-executable instructions for causing a computer to perform steps comprising:
   if a compiler determines that a particular address for a variable in an original code segment is a stack location, that the stack location is live on entry to a current transaction scope, and that the particular address of the variable has not been taken and passed to another thread, then make a first type of change to an original code segment to provide a changed original code segment, the first type of change being made in a manner that ensures failure atomicity;
   if the compiler determines that a particular address for the variable in the original code segment is the stack location, that the stack location is not live on entry to the current transaction scope, and that the particular address of the variable has not been taken and passed to another thread, then make a second type of change to the original code segment to provide a changed original code segment, the second type of change being made in a manner that is optimized by ensuring that code for logging of a prior value of the variable is not included and that code for calling a software transactional memory operation is not included; and
   if the compiler does not know whether or not the particular address for the variable is the stack location or if the compiler does not know if the particular address is passed to another thread, then make a third type of change to the original code segment to provide a changed original code segment, the third type of change being made in a manner that ensures both failure atomicity and concurrency atomicity.

12. The computer-readable storage medium of claim 11, wherein the first type of change comprises adding a call to a function that logs a prior value of the variable that can be retrieved and restored if a rollback is necessary.

13. The computer-readable storage medium of claim 12, wherein the first type of change further comprises adding a call to a transaction stack base procedure upon entry into the current transaction scope and prior to the function that logs the prior value, the call to the transaction stack base procedure being operable to log a stack pointer value.

14. The computer-readable storage medium of claim 11, wherein the second type of change comprises modifying the original code segment so that a shadow copy is saved for each local variable that is live on entry to the current transaction scope.

15. The computer readable storage medium of claim 14, wherein the second type of change further comprises modifying the original code segment so that if the current transaction subsequently aborts, the shadow copy of each local variable is copied back to the stack location.

16. The computer readable storage medium of claim 15, wherein by using the shadow copy of each local variable to ensure failure atomicity, any involvement with a software transactional memory system is avoided at runtime.

17. A method for rolling back a transaction in a software transactional memory system comprising the steps of:
   determining that a rollback is necessary;
   traversing a log backwards;
   determining that a particular field value to be restored is a local variable;
   if a stack address of the local variable is greater than a saved stack base that was saved during a call to a transaction stack base procedure, restoring the value using a processing unit to provide a restored field value in response to the stack address of the local variable being greater than the saved stack base; and
   if the stack address of the local variable is less than the saved stack base, not restoring the value in response to the stack address of the local variable being less than the saved stack base.

18. The method of claim 17, wherein the value is not restored since data was logged for the local variable that has gone out of scope.

19. The method of claim 18, wherein the data was logged in a called method.

20. A computer-readable storage medium having computer-executable instructions for causing a computer to perform the steps recited in claim 17.

* * * * *